April 3, 1928.　　　　　　　　　　　　　　　　1,664,900
B. ROSENBAUM
MIXING VALVE
Filed March 16, 1922
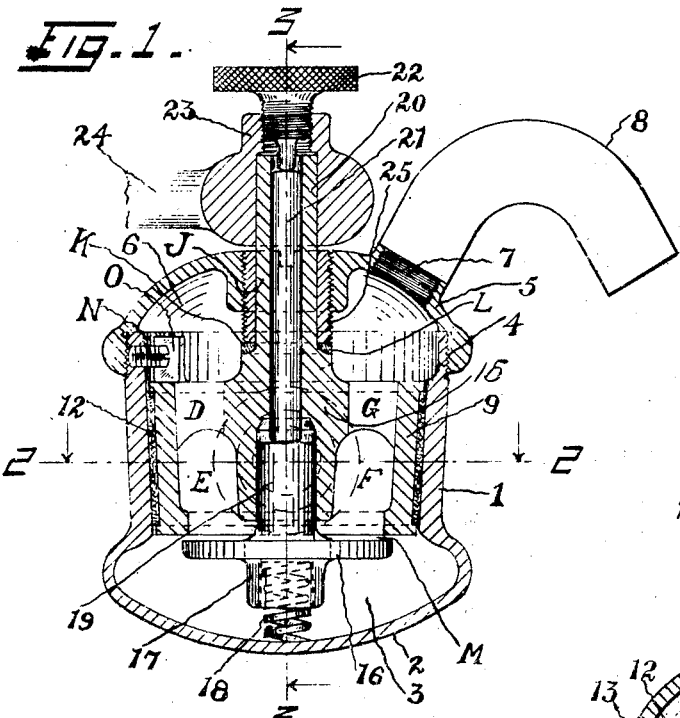
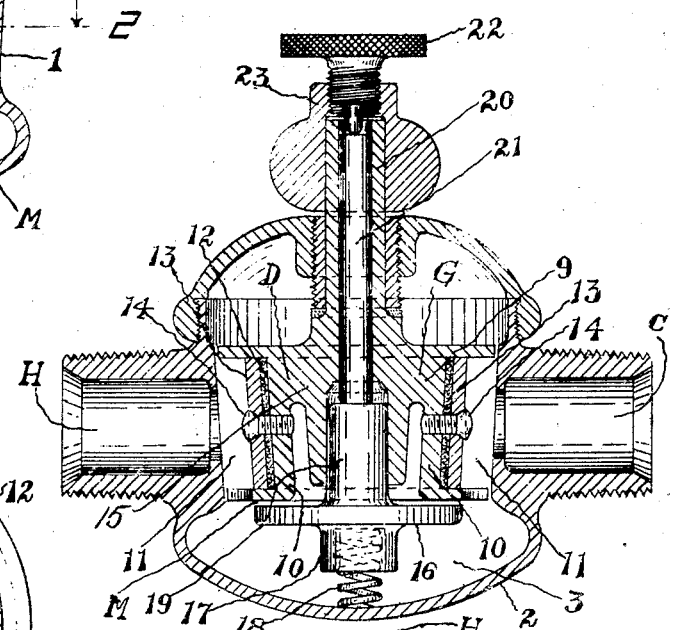
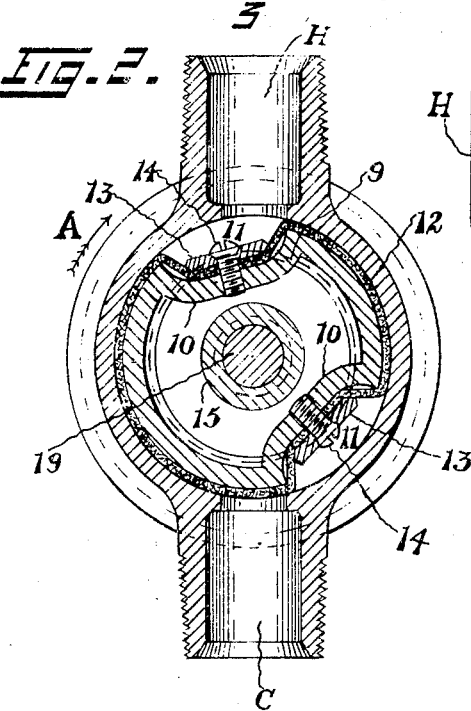
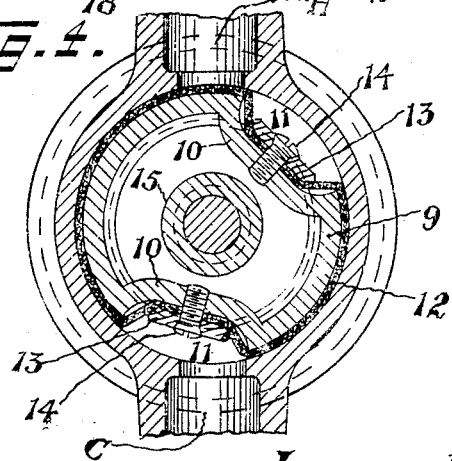
Witnesses:　　　　　　　　　　Inventor:
　　　　　　　　　　　　　Benjamin Rosenbaum,
　　　　　　　　By his Atty, Patented Apr. 3, 1928.

1,664,900

UNITED STATES PATENT OFFICE.

BENJAMIN ROSENBAUM, OF BRONX, NEW YORK.

MIXING VALVE.

Application filed March 16, 1922. Serial No. 544,257.

My present invention relates to an improvement in mixing valves for hot and cold fluids, such as water and the like, and provides a simple, practical means whereby hot and cold water may be suitably intermixed to any desired temperature, or whereby all cold water may be used or all hot water may be used, all of the varying intermediate mixtures being under the control of a single hand actuated valve.

Another object of my invention is to provide a mixing chamber and a flow chamber from the hot and cold water ducts to the point of exit in a compact construction thereby to reduce the size of the mixing valve.

Another object of my invention is to provide a means whereby the flow or velocity of the mixed fluids from the mixing chamber to exit may be adjustably and variably constrained at the will of the operator thereby to insure any desired variation of flow from the exit and at the same time to produce a thorough mixing of the two incoming streams.

Other features and capabilities will be disclosed as the description proceeds.

In the drawings, Figure 1 is a sectional view of my device in elevation;

Fig. 2 is a sectional figure taken on the line 2—2, Fig. 1, looking in the direction of the arrow.

Fig. 3 is a longitudinal section of my device taken on the line 3—3 of Fig. 1, looking in the direction of the arrows, and Fig. 4 is a sectional view similar to Fig. 2 with the valve in opposite position.

In my device there is shown a metal outer casing generally denoted by 1, and which casing is formed downwardly into a bottom extension denoted by 2, which bottom extension encloses the mechanism to be described, and provides a fluid mixing chamber 3.

The upper outer part of the casing 1 is provided with threads 4 upon which is threadedly mounted a threaded cap 5 whereby to seal the upper part of the valve proper and to provide an upper discharge chamber 6. The cap 5 is provided with a tapped opening 7, Fig. 1, whereby any desired type of bib or nozzle may be screwed therein for the purpose of permitting the water to discharge, and one of such type is indicated by 8.

Owing to the fact that I am desirous of providing, within a valve of this type, as previously described, a structure wherein I may be able to mix hot and cold water together, in equal proportions, or in any proportional variation, hot or cold, from the full cold water flow, through the direct mixtures to the full hot water stream, I have provided a valve body, generally denoted by 9, somewhat tapering, as shown in Figs. 1 and 3, said valve being substantially circular in its cross-section, as indicated in Figs. 2 and 4, but being provided with two indented web portions 10 at the circumference of said valve 9, whereby to form two substantially vertical fluid passages 11, one of said passages 11 controlling the hot water inlet port H and the other of said passages 11 controlling the cold water inlet port C.

The discharge ends of the ports 11 are restricted as compared to the ports H and C, thereby insuring a thorough agitation of the water in the mixing chamber 3, so necessary to the effective mixing of the hot and cold water in said chamber.

Both of said passages 11, as it will be observed, are located upon the outer surface of the said valve 9, so that when the valve is rotated to the position shown in Fig. 2, which is a section taken on the line 2—2 of Fig. 1, looking in the direction of the arrows, the hot water flows into the inlet H and downwardly through the passage 11 until it reaches the mixing chamber 3 below said valve. Simultaneously cold water is blocked from entering the associated passage 11 and therefore the valve in the position as shown permits only the flow of hot water into the mixing chamber 3.

Conversely, when the valve is rotated from the angular position shown in Fig. 2 to the full, opposite angular position, as indicated in Fig. 4, the hot water inlet H is entirely cut out from communication with the mixing chamber 3 and the cold water enters downwardly and fills the mixing chamber 3.

In rotating the tapered valve member 9 from the position shown in Fig. 2 to the position shown in Fig. 4, it is obvious that the two ports 11, (which are properly proportioned for this purpose) at one point of rotation, in the direction of the arrow A, Fig. 2, to the position shown in Fig. 4, uncover both ports H and C fully, so that the valve may be manually set to any desired angular position, thereby obtaining any proportional inflow of the two fluids and any desired temperature of water from extremely hot, through the intermediate variations of temperature to the extremely cold, and vice versa.

As a means for permitting an easy movement of the tapering valve, a flexible facing or packing 12 is fitted over the exterior circumferential wall of the valve 9, and this packing may be of any suitable material, such as rubber impregnated leather, and it is somewhat larger in normal diameter than the valve 9, and is readily slipped thereover, after which it is drawn to a tight operative fit by means of the introduction of a pair of drawing-in plates 13 which are held in tight engaging position in the recesses or ports 11 by means of screws 14. This means of drawing the flexible packing tightly to the seat is clearly shown in Figs. 2, 3, and 4. The reason for using a packing of this kind on the tapering seat is to prevent sticking of the valve owing to expansion of the valve, due to sudden changes in temperature as it has been found that in any tapered, metal-faced valve of the comparatively low angle shown herein, a sudden increase from cold to hot causes the valve to expand and stick on account of the low angle of repose of the coacting valve faces.

In order to permit the mixed streams of water from the ports H and C (after mixing in the lower mixing chamber 3) to pass upwardly and discharge from the nozzle 8, the valve 9, as will be seen, is substantially hollow and has two vertical passages E and F, which communicate, through the interior of the cylindrical valve, with the lower mixing port 3 and the upper discharge chamber 6 formed by the upper cap 5.

The valve 9 is provided with a hub 15 which is connected, Figs. 1 and 3, to the main cylindrical valve 9 by means of two integral spokes D and G so that rotation of the hub by means to be hereinafter described, causes the valve to oscillate.

In order to restrain the amount of fluid flow to any desired amount, I have provided a secondary control valve 16, Figs. 1 and 3, the said valve being provided with a recessed extension 17 at its lower end into which is introduced a coil spring 18 which bears against the bottom wall of the mixing chamber 3 and thereby tends to keep said flow control valve under upward tension at all times. The upper end of said valve 16 is provided with a hub portion 19 which is reciprocatively supported in a bore within the main valve hub 15 in a suitable manner.

The hub 15 of the valve 9 is provided with an outer, integral extension 20, which is bored through its entire length and into which is inserted an independent extension rod 21, the lower end of which contacts with the upper end of the hub 19 of the valve 16 and the upper end of which is in contact with the lower end of a threaded adjusting nut 22, which threaded adjusting nut is threadedly mounted in the boss 23 of a handle 24, the said handle 24 being bored to admit the upper extension of the hub 20, previously noted. The handle 24 is keyed to the hub 20 at the upper end, although the key is not shown.

The middle portion of the hub extension 20 of the valve 9, as at J, rotates within a threaded stuffing gland 25 which is threadedly secured in the cap 5, as shown in Figs. 1 and 3. At the lower end of the stuffing gland there is provided a compressible packing K which bears against a shoulder L of the upper portion of the hub 15 of the main valve 9, so that when the valve 9 is in operative position the stuffing gland 25 may be screwed down and will compress the compressible packing K, thereby holding the valve 9 against its compressible facing 12 and, in effect, forming a water tight seat so that no leakage may occur past the hub portion 20.

Inasmuch as the control flow adjusting nut 22 is carried by the handle 24 which is keyed to the hub 20, any oscillation of the handle 24 will carry with it the adjusting nut 22, so that if it is desired to increase or decrease the aperture M between the lower end of the valve 9 and the upper face of the flow control valve 16, whereby to variably increase or decrease the flow of fluid therebetween, the nut 22 may be adjusted downwardly or upwardly to cause such increase or decrease.

Another advantage of the valve 16 and its adjustability, is obtained by the restriction or "wire-drawing" of the flow of the stream past the aperture M, causing a further mixture of the two unlike temperatured fluids passing therethrough and therefore causing the stream from the exhaust nozzle 8 to be thoroughly mixed.

In order to prevent over oscillation of the valve, there is provided, as shown in Fig. 1, an interiorly inset set screw N which is screwed into the inner wall of the outer casing 1, and a pair of cooperating lugs O, only one of which is shown, the lugs O being located on the upper edge of the valve 9. By this arrangement upon rotation of the valve from the position shown in Fig. 2 to the position shown in Fig. 4, the said stops O permit no over-oscillation beyond the operative positions noted.

I claim:

1. In a device of the class described the combination with a valve casing having inlets, of a mixing chamber, a tubular valve member having lateral depressions in its outer face for connecting the inlets with said mixing chamber and passages within the valve member for discharging the water from the mixing chamber.

2. In combination, a casing formed with a mixing chamber and a valve chamber having inlets; a tubular valve member in said valve chamber forming an outlet for the mixing chamber and having in its outer face passage recesses at times communicating with said inlets and communicating with the mixing chamber.

3. In combination, a casing formed with inlets; and a tubular valve member communicating with the mixing chamber and having in its outer face longitudinal elongated passage recesses at times communicating with said inlets.

4. In combination, a casing formed with a flow chamber, a valve chamber, a mixing chamber and inlets; a hollow valve member fitted in said valve chamber and having in its outer face approximately opposite longitudinal elongated passage recesses at times communicating with said inlets and closed against communication with the flow chamber and open to communication with the mixing chamber.

5. In combination, a casing formed with a flow chamber at one end provided with an axial bearing bore and an outlet, a mixing chamber at the other end; and an intermediate valve chamber tapering toward the mixing chamber and having opposite hot and cold lateral inlets; a tapering hollow valve member in said valve chamber and having a projecting extension disposed leak-proof in said bore, and having in its outer face approximately opposite passage recesses simultaneously or non-simultaneously wholly or partly registerable with said inlets and open to communication with the mixing chamber; and an exterior handle connected to said extension.

6. In a mixing valve of the class described, a valve casing having a mixing chamber at one end thereof, a discharge chamber at the other end thereof, and a valve mechanism disposed intermediate said mixing chamber and discharge chamber, said valve mechanism comprising a main and an auxiliary flow control valve, the main flow control controlling the flowage into said mixing chamber, and the auxiliary flow control controlling the flowage from said mixing chamber into said discharge chamber.

7. In combination, a casing formed with lateral inlets; a valve member in the casing having passages at times communicating with said inlets; and a tensioned packing band covering the lateral face of said valve member.

8. In combination, a casing formed with lateral inlets; a valve member in the casing having in its outer face passage recesses at times communicating with said inlets; a flexible packing band covering the lateral face of said valve member; and means in said passage recesses for holding the packing band nested in the recesses.

9. In combination, a casing formed with lateral inlets; a valve member in the casing having in its outer face passage recesses at times registering with said inlets; a flexible packing band covering the lateral face of said valve member; and drawing-in plates held nested in said passage recesses against the outer face of the packing band.

10. In combination, a casing formed with a flow chamber having an outlet; a mixing chamber and an intermediate valve chamber having lateral inlets; a hollow valve member open at both ends in said valve chamber having a projecting extension and in its outer face approximately opposite passage recesses simultaneously of non-simultaneously wholly or partly registerable with said inlets and closed against communication with the flow chamber and open to communication with the mixing chamber; a flexible packing band covering the lateral face of said valve member; drawing-in plates held nested in said passage recesses against the outer face of the packing band; and an exterior handle connected to said extension.

11. In combination, a casing formed with a mixing chamber and inlets; a tubular valve member communicating with the mixing chamber and passages at times connecting said inlets with the mixing chamber; and means forming a narrow mixing passage between the chamber and the interior of the valve member.

12. In combination, a casing formed with a mixing chamber and inlets; a tubular valve member communicating with the mixing chamber and passagees at times connecting said inlets with the mixing chamber; and a disk coaxial and cooperating with the valve member to form a wire-drawing passage between the chamber and the interior of the member.

13. In combination, a casing formed with inlets, and having a mixing chamber at one end thereof and a discharge chamber at the other end thereof; and a valve member having passages at times connecting with said inlets to communicate with said mixing chamber; and additional means for varying the flow through the casing from the mixing chamber to the discharge chamber.

14. In combination, a casing formed with a mixing chamber and inlets; a tubular valve member communicating with the mixing chamber and having passages connecting said inlets with the mixing chamber; and additional means for adjusting the flow from the mixing chamber to the interior of the valve member.

15. In combination, a casing formed with a mixing chamber and inlets; a tubular valve member communicating with the mixing chamber and passages at times connecting said inlets with the mixing chamber; a disk-shaped control valve in said mixing chamber coaxial and spring-pressed toward the valve member for wholly or partially cutting off communication between the mixing chamber and the interior of the hollow valve member; and an adjusting means engaging the control valve.

16. In combination, a casing formed with inlets, a mixing chamber at one end thereof and a discharge chamber at the other end thereof; a tubular valve member communicating with the mixing chamber and passages at times connecting said inlets with the mixing chamber; and additional exteriorly operable means for varying the flow from the mixing chamber to the discharge chamber.

17. In combination, a casing formed with a mixing chamber and a valve chamber having inlets; a hollow valve member in said valve chamber having in its outer face passage recesses at times registerable with said inlets and communicating with the mixing chamber; a handle connected to said member; a control valve between the mixing chamber and the interior of the valve member; and adjusting means for the control valve.

18. In combination, a casing formed with a mixing chamber and inlets; a tubular valve member communicating with the mixing chamber and passages at times connecting said inlets with the mixing chamber; an adjustable control valve between the mixing chamber and the interior of the valve member; and an exterior adjusting means for the control valve passing through the valve member.

19. In combination, a casing formed with an upper flow chamber having an outlet; a lower mixing chamber and an intermediate valve chamber having lateral inlets; a hollow valve member in said valve chamber having a projecting tubular extension and in its outer face passage recesses at times registerable with said inlets and open to communication with the mixing chamber; a handle connected to said extension; an upwardly spring-pressed control valve in said mixing chamber for wholly or partially cutting off communication between the mixing chamber and the interior of the hollow valve member; and an adjusting means engaging the control valve and passing through the tubular extension and provided at the outer end of the extension with an exterior manipulating means.

20. A mixing valve of the class described, comprising a casing, two inlet ports in said casing, a movable main valve within said casing for controlling both said inlets, a lower mixing chamber being provided within said casing below said main valve and an upper discharge chamber being provided within said casing above said main valve, and flow ports located within said main valve communicating to the said upper and lower chambers.

21. A mixing valve of the class described, comprising a casing having two oppositely mounted inlet ports, a main valve for controlling both said inlets, said main valve being provided with externally located inlet ports, and being so located within said casing as to provide a lower mixing chamber communicating with said last ports, said valve being also provided with internally arranged flow ports which communicate with a discharge chamber located above said valve, and a discharge means mounted above said discharge chamber.

22. A mixing valve of the class described, comprising a casing, having two inlet ports, a main valve for controlling both said inlets located therein, said casing having a lower mixing chamber and an upper discharge chamber, flow ports located in the said main valve for communication between the said upper and lower chambers, and an auxiliary flow control valve controlling said main valve ports.

23. In a mixing valve of the class described, comprising a casing and a main valve located therein, said casing having a lower mixing chamber and an upper discharge chamber, flow ports located in the said main valve for communication between the said upper and lower chambers, an auxiliary flow control valve controlling said main valve ports, and means located upon said main valve for adjusting said auxiliary valve to increase or decrease the flow through said main valve ports.

24. A device of the class described, comprising a casing forming a mixing chamber provided with a plurality of inlet ports, a discharge chamber located within said casing, a valve within said casing for communicating between said inlet ports and the mixing chamber, said valve also having passages for connecting the discharge and mixing chambers, and variable adjusting means, operable against spring tension, for controlling the feed between the mixing and discharge chambers.

25. In combination, a casing having a discharge chamber, a mixing chamber, and a plurality of inlet ports disposed intermediate between said discharge chamber and said mixing chamber; and a valve having partitions forming restricted passages and causing the streams from said inlet ports to flow in one direction when entering said mixing chamber, said partitions forming a passage from said mixing chamber to said discharge chamber and causing the stream from said mixing chamber to flow into said discharge chamber in the opposite direction.

26. In combination, a casing having a discharge chamber, a mixing chamber, and a plurality of inlet ports disposed intermediate between said discharge chamber and said mixing chamber; and a valve having partitions forming restricted passages and causing the streams from said inlet ports to flow in one direction when entering said mixing chamber, and for causing the stream from said mixing chamber to flow in the opposite direction when entering said discharge chamber.

27. In combination, a casing formed with a discharge chamber, a mixing chamber, and there being a plurality of inlet ports disposed intermediate between said discharge chamber and said mixing chamber; and a valve having partitions forming passages for causing the streams from said inlet ports to flow in one direction into said mixing chamber, said valve also having a restricted passage and causing the stream from said mixing chamber to said discharge chamber to flow in the opposite direction.

28. In combination, a casing having a discharge chamber, a mixing chamber, and two inlet ports; and a valve having restricted passages for causing the streams from said inlet ports to flow in one direction to be thoroughly agitated when entering said mixing chamber to insure the intimate mixing of the two streams in said mixing chamber and for causing the stream from said mixing chamber to flow in the opposite direction to continue the mixing action when entering said discharge chamber.

29. In combination, a casing having a discharge chamber, a mixing chamber, and two inlet ports; and a valve having restricted passages for causing the streams from said inlet ports to flow in one direction to be thoroughly agitated when entering said mixing chamber to insure the intimate mixing of the two streams in said mixing chamber, said valve also having a passage from said mixing chamber to said discharge chamber for causing the stream to flow in the opposite direction into said discharge chamber.

30. In combination, a casing having a discharge chamber, a mixing chamber, and two inlet ports; and a valve having passages for causing the streams from said inlet ports to flow in one direction into said mixing chamber, said valve also having a restricted passage to cause the stream from said mixing chamber to flow in the opposite direction into said discharge chamber to be further mixed.

31. In a device of the class described, the combination with a valve casing having inlets, of a mixing chamber, a valve member having lateral depressions for connecting the inlets with said mixing chamber, and a passage within the valve member for discharging the water from the mixing chamber.

32. In a device of the class described, a valve casing having inlets, a mixing chamber, and a discharge chamber, a valve member in said casing having lateral depressions adapted to connect the inlets with said mixing chamber, and a passage within the valve member to afford flowage from said mixing chamber to said discharge chamber.

33. In a device of the class described, a valve casing having inlets, a mixing chamber, and a discharge chamber, a valve member in said casing disposed intermediate said mixing chamber and discharge chamber, said valve member having lateral depressions adapted to connect the inlets with said mixing chamber, and a passage extending through said valve member to accommodate flowage from said mixing chamber to said discharge chamber.

BENJAMIN ROSENBAUM.